Patented Jan. 15, 1952

2,582,919

UNITED STATES PATENT OFFICE 2,582,919

COLORING GLASS FIBERS

Lawrence P. Biefeld, Newark, N. J., assignor to Owens-Corning Fiberglas Corporation, a corporation of Delaware No Drawing. Application August 28, 1946,
Serial No. 693,582

7 Claims. (Cl. 41—42)

This invention relates generally to the manufacture of glass fibers and is more particularly concerned with the treatment of glass fibers and fabrics produced from glass fibers whereby the latter may be readily colored.

The development of an ever widening field of uses for fabrics and textiles produced from fibrous glass has led to the need for an economical method of dyeing the fibers to a wide variety of colors which are not only fast to laundering, dry cleaning and crocking but, in addition, are reasonably light-fast.

One of the primary objects of this invention is to greatly improve the technique of coloring fibrous glass by providing a method which may be economically carried out on a production basis and which assures applying the particular dye selected in such a manner that the resulting color will remain commercially stable over a long period of use.

Another object of this invention is to substantially increase the tenacity with which dyes are held to the surfaces of the glass fibers. This is accomplished by providing a substantial sorptive capacity in the fibrous glass by leaching out at least some of the constituents, such as the fluxing materials used in melting the glass, and thus provide at the surfaces of the fibers sufficient porosity to enable the dye to be readily sorbed into the surfaces.

A further object of the present invention is to render the surfaces of the fibers sufficiently porous to obtain the required sorption of the dye without unduly decreasing the strength of the fibers.

Although the leaching technique may vary in dependence upon the particular composition of the glass, nevertheless, acid solutions may be generally used to extract non-siliceous constituents from both borosilicates and non-borosilicate compositions. The present invention concerns itself more particularly with dyeing fibers composed of borosilicate glasses which are substantially free from alkali metal oxides, but which contain substantial amounts of second group oxides and alumina. Still more particularly the following leaching and dyeing procedure is especially satisfactory when used in connection with a borosilicate glass containing the following constituents in the approximate proportions noted.

| | Percent |
|---|---|
| SiO₂ (silicate) | 50 to 57 |
| Al₂O₃ (alumina) | 11 to 16 |
| CaO (calcium oxide) | 12 to 20 |
| MgO (magnesia) | 2 to 8 |
| B₂O₃ (boron oxide) | 8 to 12 |

A borosilicate glass of the above general type has been found particularly satisfactory in the manufacture by known processes of fine glass fibers having substantial tensile strength and suitable for producing high quality woven or unwoven cloths or fabrics. When fibers are made in this way they are readily treated in accordance with the invention.

Other glass compositions lending themselves to production in this way of fibers that may be treated in accordance with the present invention are as follows:

| | 1 | 2 | 3 | 4 | 5 |
|---|---|---|---|---|---|
| SiO₂ | 62.7 | 61.8 | 56 | 75 | 61.9 |
| Na₂O | 6.6 | 7.1 | | 5 | 26.6 |
| Al₂O₃ | 3.5 | 3.6 | 12 | | |
| B₂O₃ | 26.9 | 27.5 | 5 | 20 | |
| CaO | | | 22 | | |
| Mg | | | 5 | | |
| ZrO₂ | | | | | 11.5 |

The major portion of the non-siliceous constituents of such a glass are insoluble in water, but are soluble in certain acid solutions. In the present instance, the fibrous glass is preferably leached in an aqueous solution of hydrochloric acid, although other acid solutions such, for example, as nitric acid may be used. Extracting the non-siliceous constituents from the glass fibers weakens the fibers and care is exercised in controlling the leaching operation to provide the fibers with sufficiently porous surfaces to effectively sorb dyes without seriously weakening the fibers. The amount of leaching obtained depends on the hydrated hydrogen-ion concentration, the temperature of the solution and the time the fibers are retained in the solution. In instances where glass fiber cloth is leached, the rate of leaching also depends on the type of weave and the thickness of the cloth. Thick cloths that are tightly woven are leached more slowly than relatively thin loosely woven cloths. The proper amount of leaching for any particular type of cloth is preferably determined by trial to reach the optimum conditions herein disclosed.

Although, in practicing the present invention care is taken to only partially leach the glass fibers, nevertheless, the acid concentration of the solution is not particularly critical and may be varied within a reasonable range. However, for general dyeing purposes, particularly satisfactory results have been obtained by leaching the fibers for a period of approximately forty minutes in an aqueous solution of hydrochloric acid having a concentration of substantially 0.10 molar. This treatment leaches about 10% by weight of the constituents from the glass and it has been found that the resulting glass fibers not only possess the requisite strength but, in addition, are sufficiently porous to effectively sorb dyes.

Of course, the percentage of leaching may be increased or decreased by increasing or decreasing the time the glass fibers are retained in the acid solution. For example, if the glass fibers remain in a solution of hydrochloric acid of the above concentration for one hour, approximately 12% leaching is obtained and if the fibers are removed from the solution after the lapse of four minutes only about 4.5% leaching results. On the other hand, an approximate 10% leaching of glass fibers may be obtained by maintaining the fibers in an aqueous solution of hydrochloric acid having a concentration of 0.20 molar for a period of approximately twenty minutes. Thus, it will be seen that practically any percentage of leaching may be secured by varying either or both the acid concentration and the time interval the fibers are retained in the solution with a degree of leaching amounting to a loss of weight of the fibrous material of 10% being preferred.

As indicated above a dilute solution of nitric acid may also be used to extract the constituents from the glass fibers, but this solution usually requires a longer leaching time to secure the same results obtained with a dilute solution of hydrochloric acid and is, therefore, not as practical for commercial use.

It is customary in the production of glass fibers to coat the fibers with a lubricant such as an oil, wax, or other greasy or unctuous material in order to prevent abrasion of the fibers during spinning and during their fabrication into woven or unwoven fabrics. While such coatings may not interfere with the actual leaching of the fibers, nevertheless, they tend to contaminate the leaching bath and the residue from the organic materials present may cause discoloration of the final fibers. Hence, it is usually desirable to remove the coating, either by heat treating the glass fibers at about 300° C. or by treating the fibers with a suitable solvent prior to the leaching operation. One suitable method of removing the coating is to wash the fibers in warm water containing a detergent such, for example, as dioctyl ester of sodium sulfosuccinic acid. The use of a solvent to clean the fibers is preferred especially in cases where strength of the fibers is a consideration, because heat-cleaning the fibers has a tendency to reduce the tensile strength of partially leached fibers.

By following the above procedure, the non-siliceous constituents of the glass fibers are partially leached out to form pores in the surfaces of the fibers which greatly increase the sorbing characteristics of the glass for positively charged particles of cationic materials. In other words, the partially leached fibers are negatively charged so that positively charged dye ions such, for example, as those of the basic dyes may be sorbed directly by the glass. Acid dyes, direct formaldehyde dyes, and lake dyes are preferably applied to the partially leached fibers with the aid of suitable basic mordants among which are the following:

(1) 3% chrome, 4% tartar
(2) 2% chrome, 2% formic acid
(3) 3% chrome, 3% oxalic acid
(4) 10% alum, 3% tartar, 2% oxalic acid
(5) 3% alum sulfate, 5% tartar
(6) 4% stannous chloride, 2% oxalic acid
(7) 5% blue stone, 4% tartar
(8) Hydrated aluminum oxide sol
(9) Hydrated chromium oxide sol
(10) Hydrated tin oxide sol When using any one of the first seven listed mordanting agents, it is usually necessary to boil the cloth for at least one-half hour in the mordant. This prolonged boiling has a tendency to weaken the partially leached fibers and for this reason, it is preferred to use one of the hydrated oxide sols as a mordanting agent. Moreover, it has been found that dyes applied with hydrated oxide sols in general and aluminum oxide sol in particular are more fast to laundering than any of the other mordants listed. In practicing this invention, the partially leached glass fibers are preferably steeped in the selected mordant for a predetermined period, for example, one half-hour, and are then dipped in the selected dye bath.

Particularly satisfactory results have been obtained by using a 0.2% concentration of direct formaldehyde dyes with hydrated aluminum oxide sol as a mordant. Several of the numerous direct formaldehyde dyes that may be used are "Benzoform Bordeau Yellow," "Fast Green BBC," and "Fast Scarlet GC." Many other direct formaldehyde dyes may be used with equal success, but the foregoing examples will suffice for the purpose of this illustration. If desired, direct formaldehyde dyes may be applied to the fibrous material without the aid of a mordant, but in cases where the dye must be fast to laundering, it is preferred to use the mordant, because the latter resists fading of the color in the presence of hot water and soap solutions.

Partially leached glass fibers may also be colored by treating the fibers with aluminum oxide sol and steeping the same for approximately one-half hour in a 0.2% solution of an acid dye. Any one of a number of acid dyes may be used such, for example, as "Polar Red B," "Acid Green" or "Cloth Fast Yellow GC."

Another possibility is to steep the fibrous glass for approximately one-half hour in a lake or bath comprising aluminum oxide sol and a lake dye such, for example, as "Lithosol Red 2B." As a result of the above, the partially leached fibers are dyed to a deep red which is fast to laundering, dry cleaning and crocking.

The colored ions of the basic dyes have a positive charge as distinguished from the negative charge on the partially leached glass fibers and, as a consequence, may be applied directly to the fibers without the aid of a mordant. When employing basic dyes, the fibrous glass is steeped in a 0.2% solution of the selected dye for a period depending on the shade desired. Several examples of basic dyes are "Auramine O Conc.," "Phosphine G N Conc.," "Brilliant Green Crystals," "Crystal Violet," and "Brilliant Green C."

Regardless of the particular dye employed, the fibrous glass is rinsed in water to remove the excess, non-sorbed dye and is subsequently dried. Subsequent to the drying operation, the glass fibers may be dipped in a one-half per cent solution of "Cationic Softener X" to soften and render the fibers pliable. Also, the dyed glass fibers may be coated with a resinous film or with an elastomer to prevent rubbing-off of the dye. Particularly satisfactory results have been obtained by coating the dyed fibers with either "Buna S" (a butadiene styrene copolymer) or "Buna N' (a butadiene acrylonitrile copolymer) latex concentrations of about six ounces per gallon.

Both organic and inorganic pigments can be deposited in the pores of the fibers by steeping the fibers in an aqueous dispersion of the pigments for about one-half hour at 100° F. Some organic pigments include phthalocyonines, anthroquinones and vat dyes and both soluble and insoluble azo dyes. Inorganic dyes suitable for this process include chromates, iron oxides, cobalt oxides and cadmium oxides.

Inorganic pigments can also be introduced in the following manner into the pores of glass fibers which have been partially leached in accordance with this invention. In carrying out this procedure, the porous surfaces of the glass fibers are first impregnated with a salt of a metal, which will form a colored precipitate, by immersing it in a solution thereof. The glass fibers are rinsed and transferred to a solution of another salt which will form the desired precipitate to effect precipitation in the pores of the glass fibers. For example, partially leached glass fibers may be heated for about one-half hour at approximately 140° C. in a solution of ferric chloride in glycol and, after rinsing with water, may be dipped in a solution of potassium ferrocyanide to form "Prussian Blue" in the pores of the fibers. Another example is to heat partially leached glass fibers in a solution of lead acetate dissolved in glycol. The treated fibers are then immersed in a solution of potassium dichromate to form a precipitate of lead chromate, "chrome yellow" in the pores and thereby impart a transparent yellow shade to the fibers.

Various organic plastics or resins can be used to fill the pores of the partially leached glass fibers. For example, the partially leached glass fibers may be treated with a solution of the desired plastic in a suitable solvent to fill the pores therewith and the solvent may thereafter be evaporated from the pores. In this manner polyvinyl acetate dissolved in its monomer was introduced into the pores of the partially leached glass fibers and the solvent was evaporated to leave the resin in the surfaces of the fibers.

If desired, organic resins or plastics can be introduced into the pores as the monomer and thereafter polymerized to fill the pores with the solidified plastic. For example, partially leached glass fibers may be immersed in monomeric methyl methacrylate containing a small amount of benzoyl peroxide as a catalyst. The fibers may then be heated for about eight hours at approximately 70° C. in a sealed chamber containing a small amount of the monomer. The methyl methacrylate within the pores may then be polymerized to a solid resin leaving the fibers transparent. The fibers may be colored by first dyeing the fibers as described above or by dissolving the selected dye in the plastic before the latter is introduced into the pores.

Since partially leached glass fibers colored in accordance with any of the above processes may still possess substantial porosity, it is desired, where a high temperature product is required, to seal the pores by heating the fibers for about ten minutes at approximately 800° C., or for several hours at a temperature of about 600° C. This alternative step in the process not only greatly increases the heat resistance of the fibers, but in addition, improves the electrical resistance thereof and enables using the fibers for insulation of electrical conductors which are employed under conditions of elevated temperatures.

In another method for obtaining high temperature resistance the pores can be filled with silicone resin such as colorless ethyl phenyl polysiloxane or dimethyl polysilicol and cured to give good heat resistance of the colored fibers and good electrical resistance.

In the process described above, refiring, or the silicone resin topping process, only pigments which have the best temperature resistance can be used to color the fibers such as copper blue, cobalt blue, iron oxide brown, cadmium red, or chrome yellow. These may be the same pigments used in colored, vitrified enamels. These inorganic pigments are deposited in the pores by steeping in a suspension of the pigment in water. The fibers may then be heat treated to close the pores or silicone resin may be applied to the fibers to coat over the pores and fibers. The resin is baked on and a colored fiber with temperature resistance and electrical resistance is obtained.

Again, the pigment may be dispersed in the silicone resin and the colored resin introduced into the pores. The fibers are baked to cure the resin and a colored fiber results which has good temperature resistance and electrical resistance. The baking temperature varies with type of silicone resin used. For example, dimethyl polysilicol cures at 150° C. for one hour and ethyl phenyl polysiloxane cures at 250° C. for one hour.

Various modifications of the present invention may be resorted to within the spirit of the invention and the scope of the appended claims.

I claim:

1. The method of coloring glass fibers comprising subjecting glass fibers constituted with siliceous and non-siliceous materials to reaction with dilute acid solutions that preferentially dissolve the non-siliceous component until solution of less than 25 percent by weight of the glass fibers has been effected, removing the solution and dissolved substances to present glass fibers having highly porous surfaces, and then treating the fibers to embed colored particles within the pores.

2. The method of coloring glass fibers comprising extracting about 10 percent by weight from the surfaces of the fibers by reaction of the fibers constituted of siliceous and non-siliceous materials with aqueous inorganic acid solutions other than hydrofluoric acid to dissolve primarily of the non-siliceous component, removing the acid substances and dissolved material to leave glass fibers with highly porous surfaces, implanting colored particles into the pores, and then treating the fibers to provide a protective coating for the colored particles in the pores.

3. The method of coloring glass fibers comprising extracting less than 25 percent (calculated on the basis of the weight of the fibers) from the surfaces of the fibers by reaction of the fibers constituted of siliceous and non-siliceous materials with inorganic acids other than hydrofluoric acid to dissolve primarily of the non-siliceous component, removing the acids and dissolved material to leave glass fibers with highly porous surfaces, implanting colored particles into the pores, and then impregnating the pores with a resinous material.

4. The method, as claimed in claim 3, in which the resinous material is an organo-silicon compound.

5. The method, as claimed in claim 1, in which the treatment to embed colored particles into the pores comprises impregnating the fibers with a lake formed of organic dye and a mordant.

6. The method, as claimed in claim 1, in which the treatment to embed colored particles into the pores comprises depositing a mordant in the pores and then treating the fibers with a dye for association with the mordant.

7. The method of coloring glass fibers comprising extracting less than 25 percent (calculated on the basis of the weight of the fibers) from the surfaces of the fibers by reaction of the fibers constituted by siliceous and non-siliceous materials with inorganic acids other than hydrofluoric acid to dissolve primarily of the non-siliceous component, removing the acids and dissolved material to leave glass fibers with highly porous surfaces, and impregnating the fibers to fill the pores with a composition consisting essentially of a resinous material and a tinctorial agent.

LAWRENCE P. BIEFELD.

REFERENCES CITED

The following references are of record in the file of this patent:

UNITED STATES PATENTS

| Number | Name | Date |
|---|---|---|
| 2,133,238 | Slayter et al. | Oct. 11, 1938 |
| 2,184,320 | Simpson | Dec. 26, 1939 |
| 2,220,862 | Blodgett | Nov. 5, 1940 |
| 2,258,218 | Rochow | Oct. 7, 1941 |
| 2,261,148 | Ebaugh | Nov. 4, 1941 |
| 2,303,756 | Nordberg et al. | Dec. 1, 1942 |
| 2,315,259 | Hyde | Mar. 30, 1943 |
| 2,315,329 | Hood | Mar. 30, 1943 |
| 2,331,944 | Pazsiczky | Oct. 19, 1943 |
| 2,355,746 | Nordberg et al. | Aug. 15, 1944 |
| 2,390,370 | Hyde | Dec. 4, 1945 |
| 2,401,537 | Adams | June 4, 1946 |
| 2,407,483 | Ebaugh | Sept. 10, 1946 |
| 2,461,841 | Norberg | Feb. 15, 1949 |

FOREIGN PATENTS

| Number | Country | Date |
|---|---|---|
| 559,068 | Great Britain | Feb. 2, 1944 |

OTHER REFERENCES

Turner, Journal of the Society of Glass Technology, May, 1927, page 19.